May 13, 1958
T. C. REEVES
2,834,622
CONNECTING MEANS FOR CABLE-SUPPORTING
TROUGH SYSTEMS AND THE LIKE
Filed Dec. 15, 1954
2 Sheets-Sheet 2
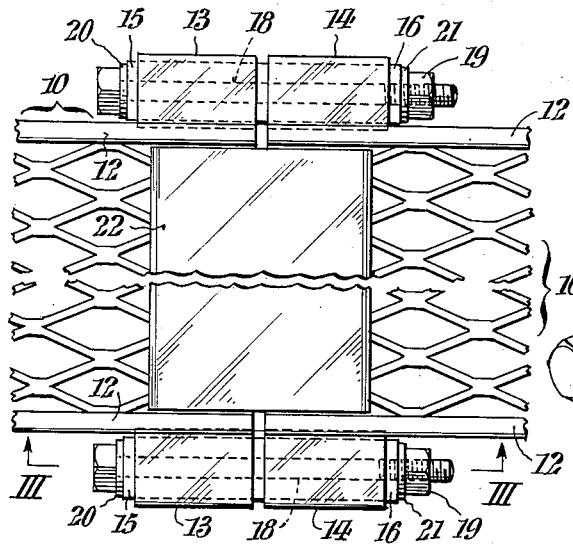
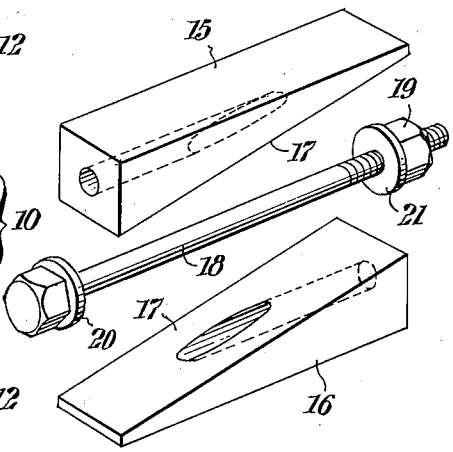
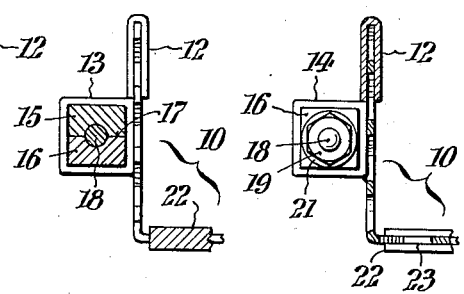
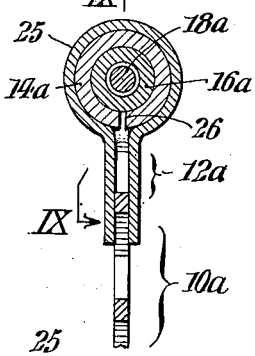
INVENTOR:
Thomas C. Reeves,
BY Paul & Paul
ATTORNEYS.

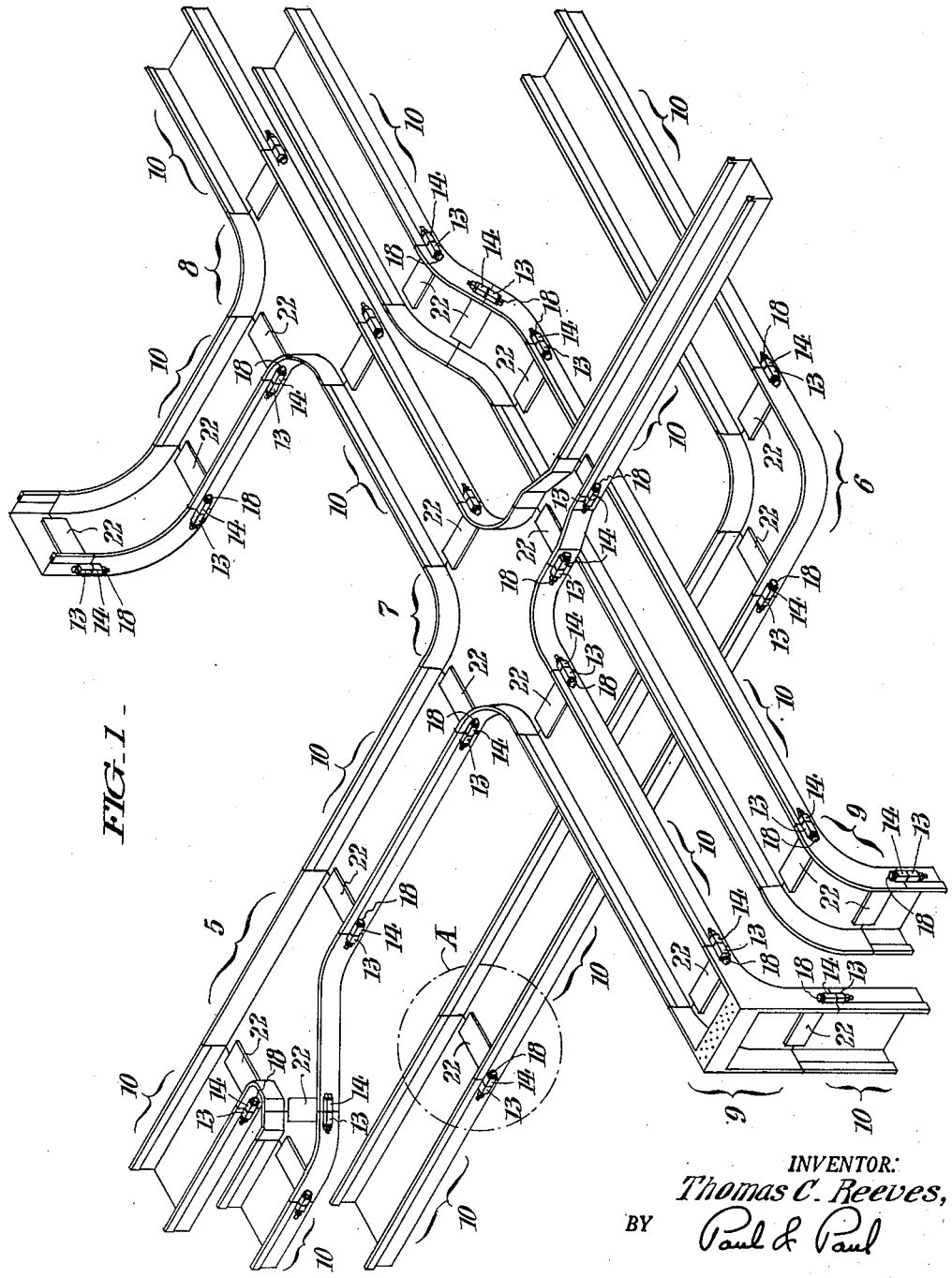

United States Patent Office 2,834,622
Patented May 13, 1958

2,834,622
CONNECTING MEANS FOR CABLE-SUPPORTING TROUGH SYSTEMS AND THE LIKE

Thomas C. Reeves, Philadelphia, Pa., assignor to T. J. Cope, Inc., Philadelphia, Pa., a corporation of Pennsylvania Application December 15, 1954, Serial No. 475,374

3 Claims. (Cl. 287—62)

This invention relates to connecting means for use in erecting or setting up trough systems for the support of control and power cables in electric power stations or of tubing in chemical processing plants and the like. More specifically, it is concerned with means for joining together, end to end, various pre-fabricated channel components of such systems, including straight-away sections, elbow fittings, T fittings, cross fittings etc., in a definite order or sequence with the channelling continuous or communicating, as may be necessary to meet special requirements likely to be met within practice.

My invention is directed, in the main, toward the provision of a simple reliable and inexpensive means by which different pre-fabricated component parts of trough systems of the kind referred to can be rigidly connected together in the field in a minimum of time, without necessitating employment of specially skilled help or the use of any special tools in assembling.

Other objects and attendant advantages will appear from the following detailed description of the attached drawings, wherein:

Fig. 1 is a fragmentary view in perspective of a cable or tube-supporting trough system whereof the various pre-fabricated components are joined together, end to end, by connecting means conveniently embodying my invention in one form.

Fig. 2 is a broken out fragmentary view in top plan showing two straight-away components of the trough system of Fig. 1 joined by connecting means in accordance with my invention.

Fig. 3 is a longitudinal sectional view taken as indicated by the angled arrows III—III in Fig. 2.

Figs. 4 and 5 are fragmentary detail views in transverse section taken as indicated respectively by the angled arrows IV—IV and V—V in Fig. 3.

Fig. 6 is an exploded view showing, in perspective, certain component parts of the connecting means.

Fig. 7 is a fragmentary view in side elevation of two unit trough components joined by a modified form of my improved connecting means.

Fig. 8 is a detail view in transverse section, taken as indicated by the angled arrows VIII—VIII in Fig. 7, and drawn to a larger scale; and Fig. 9 is a fragmentary view in longitudinal section taken as indicated by the angled arrows IX—IX in Fig. 8.

The cable supporting trough system exemplified in Fig. 1 of these drawings is a typical one in which branch fittings 5, elbow fittings 6, cross fittings 7, T fittings 8 and drop fittings 9 are variously interposed between straight-away channel components 10 to form continuous or communicating ways into which the cables or tubes are to be laid.

In Figs. 2–5 of these illustrations I have shown two straight-away trough components 10 of the system of Fig. 1 at the region A connected together by one form of my improved connecting means. The components 10 are fashioned in this instance from intersticed or expanded sheet metal to square U-shaped cross section, with the top edges of their side walls finished off with longitudinally folded permanently-attached reinforcing strips 12 of solid sheet metal. The trough components 10 may be integrally fabricated throughout from solid sheet or, as shown, or from expanded metal bottoms and solid sides if desired or found more convenient. The connecting means here illustrated comprises pairs of tubular elements 13 and 14 respectively which are square in cross section and which are secured, as by welding, in horizontal position to the side walls of the components 10 adjacent the confronting ends of the latter immediately below the reinforcing strips 12. Fitting within the aligned hollows of the elements 13 and 14 are pairs of opposing wedge members 15 and 16 which are square in cross section in correspondence with that of said members, and which contact each other in a plane 17 inclined to the horizontal. The connecting means further comprise coupling members in the form of headed screw bolts 18, whereof the shanks are passed through registering apertures in the wedge members 15 and 16, the shanks of said bolts being provided at their protruding ends with draw-up nuts 19, and washers 20 and 21 are interposed respectively between the bolt heads and the corresponding square ends of wedge members 15 and between the nuts 19 and the corresponding ends of the wedge numbers 16. With this arrangement, it will be seen that, by tightening the nuts 19, the wedge members 15 and 16 of the respective pairs will be drawn toward each other and at the same time spread apart laterally into binding relation with the surfaces of the hollows in the tubular elements 13 and 14, thereby rigidly uniting the trough components 10 against subsequent separation. As a means for covering the transverse raw cut edges of the trough components 10 and rendering them continuous, I have provided a fairing element 22. As shown, this fairing element 22 is formed from relatively stout plate metal with grooves 23 in its opposite longitudinal edges to receive and marginally overlap the raw end edges of the two trough components. In addition to the function already attributed to it, the fairing plate 22 serves to strengthen the juncture between the trough components 10 as will be readily understood. The fairing plate 22 is inserted, of course, between the contiguous ends of the trough components 10 before the nuts 19 and the screw bolts 18 are fully drawn up. It is to be understood that the parts 15, 16 and 18 of the connecting means are loosely pre-assembled at the factory for use in the field.

Coupling means of the form shown in Figs. 2–5 can be used, as illustrated in Fig. 1, to connect the ends of the straight-away trough components to the confronting ends of the various juncture fittings 5, 6, 7, 8 and 9 in precisely the same manner as above described.

In the alternative embodiment of my invention illustrated in Figs. 7–9, the reinforcing strips 12a at the top edges of the side walls of the trough components 10a are formed with circular section beads 25. Here also, if desired or found more convenient, the components 10a may be integrally fabricated throughout from solid sheet metal with the top edges of the side walls rolled to provide the beads. The tubular elements 13a and 14a of the connecting means are longitudinally split as at 26 in Fig. 9 and their bores are coned inwardly from the inner ends thereof. The wedge members 15a and 16a are, in this instance, coned to conform with the coned bores of the tubular elements 13a and 14a and are drilled and tapped axially to threadedly engage the reversely-pitched threads on the end portions of the screw bolt 18a, said bolt having a polygonal head 27 at the center for wrench application. In this form of my invention, the wedge members 15a and 16a are likewise loosely pre-assembled with the screw bolts 18a and with the tubular elements 13a and 14a at the factory in readiness for use in field. By turning the screw bolts 18a in the proper direction, after insertion of the tubular elements 13a and 14a into the hollows of the beads 25 of the reinforcing strips 12a on the trough units 10a, the wedge components 15a and 16a are drawn toward each other with the result that said tubular elements are expanded within the beads of said reinforcing strips. As in the first described embodiment, a fairing strip 22a is provided to bridge the raw transverse edges of the trough components 10a. Obviously, the alternative form of connecting means of Figs. 7–9 can be utilized in the trough system of Fig. 1 in lieu of the first described form.

From the foregoing, it will be seen that I have provided simple and effective means whereby the confronting ends of straight-away and other components of cable or tube supporting trough systems can be quickly connected together without the necessity for employing specially skilled help or the use of special tools other than an ordinary wrench. The same facility applies, of course, to disconnection of the trough components in making desirable changes in the trough system after its initial installation.

Having thus described my invention, I claim:

1. Means for connecting together, end to end, prefabricated channel section trough components of cable or tube-supporting trough systems, comprising pairs of axially-aligned tubular lugs, the lugs of each pair being horizontally arranged and affixed to corresponding side walls of the trough components adjacent the confronting ends of said walls; pairs of cooperative overlapping wedge members meeting in an inclined plane and respectively engaged in the corresponding pairs of lugs; and screw means for drawing the wedge members of the respective pairs toward each other for lateral expansion within the hollows of the lugs.

2. The invention according to claim 1, wherein the coupling means are in the form of headed screw bolts whereof the shanks are passed through horizontally-registering apertures in the wedge members and are respectively provided on the protruding distal ends of their shanks with take-up nuts.

3. The invention according to claim 1, wherein the lugs elements are polygonal in cross section, and wherein the wedge members are correspondingly configured in cross section.

References Cited in the file of this patent

UNITED STATES PATENTS

| | | |
|---|---|---|
| 497,466 | Davidson | May 16, 1893 |
| 2,682,321 | Brock | June 29, 1954 |

FOREIGN PATENTS

| | | |
|---|---|---|
| 553,797 | France | 1923 |
| 591,253 | Great Britain | 1947 |